United States Patent
Yokoyama

(10) Patent No.: US 6,843,952 B1
(45) Date of Patent: Jan. 18, 2005

(54) METHOD OF PRODUCING SUBSTRATE FOR PLASMA DISPLAY PANEL AND MOLD USED IN THE METHOD

(75) Inventor: Chikafumi Yokoyama, Kawasaki (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/913,687

(22) PCT Filed: Feb. 16, 2000

(86) PCT No.: PCT/US00/03953

§ 371 (c)(1),
(2), (4) Date: Aug. 16, 2001

(87) PCT Pub. No.: WO00/58990

PCT Pub. Date: Oct. 5, 2000

(30) Foreign Application Priority Data

Mar. 25, 1999 (JP) ............................................ 11-082003

(51) Int. Cl.⁷ ......................... B29C 33/42; B29C 35/08; B29C 39/10
(52) U.S. Cl. ...................... 264/496; 264/134; 264/259; 264/219
(58) Field of Search ................................ 264/496, 134, 264/259, 313, 219; 425/174.4; 430/281.1

(56) References Cited

U.S. PATENT DOCUMENTS

| | | | |
|---|---|---|---|
| 4,668,607 A | * | 5/1987 | Wojcik ..................... 430/281.1 |
| 5,747,931 A | | 5/1998 | Riddle et al. |
| 5,814,267 A | | 9/1998 | Sakai et al. |
| 5,853,446 A | | 12/1998 | Carre et al. |
| 5,992,320 A | | 11/1999 | Kosaka et al. |
| 6,306,948 B1 | * | 10/2001 | Yokoyama et al. ......... 524/492 |
| 6,616,887 B2 | * | 9/2003 | Chiu et al. .................. 264/496 |

FOREIGN PATENT DOCUMENTS

| | | |
|---|---|---|
| EP | 0 935 275 | 8/1999 |
| FR | 2 738 393 A | 3/1997 |
| JP | 8-273537 | 10/1996 |
| JP | 8-321258 | 12/1996 |
| JP | 9-12336 | 1/1997 |
| JP | 9-134676 | 5/1997 |
| JP | 9-283017 | 10/1997 |
| WO | WO 99 10909 A | 3/1999 |
| WO | WO 99 60446 A | 11/1999 |

OTHER PUBLICATIONS

Patent Abstracts of Japan, vol. 1997, No. 05, May 30, 1997 & JP 09 012336 A (Asahi Glass Co Ltd), Jan 14, 1997 cited in the application abstract.

* cited by examiner

Primary Examiner—Michael Colaianni
Assistant Examiner—Yewebdar Tadesse
(74) Attorney, Agent, or Firm—Carolyn A. Fischer

(57) ABSTRACT

A method of producing a substrate for a plasma display panel by providing a rib on a base, which comprises the steps of contacting a rib precursor containing a first photo-setting initiator having a first absorption edge and a first photo-setting component closely with said base; filling a mold, obtained by photo-setting of a second photo-setting initiator having a second absorption edge whose wavelength is shorter than a wavelength corresponding to said first absorption edge of said first photo-setting initiator, with said rib precursor; exposing said rib precursor to light having a wavelength longer than a wavelength corresponding to said second absorption edge, thereby setting said rib precursor; and removing said mold.

12 Claims, 2 Drawing Sheets

METHOD OF PRODUCING SUBSTRATE FOR PLASMA DISPLAY PANEL AND MOLD USED IN THE METHOD

The present invention relates to a method of producing a substrate for a plasma display panel (hereinafter also referred to as "PDP") and a mold used in the method.

BACKGROUND

PDP is expected to be used as a thin large-image display device. Generally, PDP is equipped with a so-called substrate for PDP. Typical substrate for PDP is composed of a pair of glass flat plates facing each other at a distance via a rib having a predetermined dimension (also referred to as a barrier rib, partition or barrier). In this case, such a rib separates space between a pair of glass plates into cells in an air-tight manner to form a plurality of discharge display cells capable of containing a discharge gas such as neon, helium or xenone.

Various suggestions have been made to produce and provide the rib and, for example, a method of using a mold is known. Generally, according to this method, a molding material is filled up in the mold and is converted into a molded article capable of transferring to a plate-shaped base by a thermal or optical action. On removing the mold from the rib, the rib is produced and provided, nearly continuously, with comparatively high accuracy.

In the case of a general substrate for PDP, for example, a base made of glass or ceramic and a rib are used. On the other hand, a mold for a typical substrate for PDP is made of a metal, glass or ceramic as disclosed, for example, in Unexamined Patent Publication (KOKAI) No. 9-12336. Accordingly, the base and nib have almost the same hardness as or lower than that of the mold. As a result, when the mold is removed from the rib, there is a fear of causing breakage of the base or rib, or breakage of the mold itself. Such severe breakage often occurs when the rib is press-molded by using a mold made of glass, ceramic or metal as disclosed in Unexamined Patent Publication (KOKA) No. 9-283017. The mold is repeatedly used for mass production. It is not preferred to leave the broken rib in the mold, since it is necessary to wash the mold every time the rib is made, thereby lowering the productivity.

Unexamined Patent Publication (KOKAI) No. 9-134676 also discloses that a mold made of a silicone resin having a hardness lower than that of glass or ceramic is used. However, the silicone resin is generally brittle. Accordingly, it cannot be expected to repeatedly use the mold made of the silicone resin for mass production.

SUMMARY OF THE INVENTION

It is an object of the present invention to provide a method of producing a substrate for PDP, capable of repeatedly using a mold with avoiding breakage of a base or a rib, and a mold used in the same.

According to the present invention, there is provided a method of producing a substrate for a plasma display panel by providing a rib on a base, which comprises the steps of:

contacting a rib precursor containing a first photo-setting initiator having a first absorption edge and a first photo-setting component closely with said base;

filling a mold, obtained by photo-setting of a second photo-setting initiator having a second absorption edge whose wavelength is shorter than a wavelength corresponding to said first absorption edge of said first photo-setting initiator, with said rib precursor;

a exposing said rib precursor to light having a wavelength longer than a wavelength corresponding to said second absorption edge, thereby setting said rib precursor; and removing said mold.

The term "absorption edge", used in the present specification refers to a wavelength portion wherein an absorbency in a continuous light absorption spectrum of an object drastically decreases and it becomes transparent when the wavelength becomes longer than said wavelength portion.

According to the present invention, there is also provided a mold for a substrate for a plasma display panel comprising a base and a rib formed from a rib precursor containing a first photo-setting initiator having a first absorption edge and a first photo-setting component, said mold being obtained by photo-setting a second photo-setting component in the presence of a second photo-setting initiator having an absorption edge whose wavelength is shorter than a wavelength corresponding to said first absorption edge of said first photo-setting initiator.

DETAILED DESCRIPTION

Figure 1:
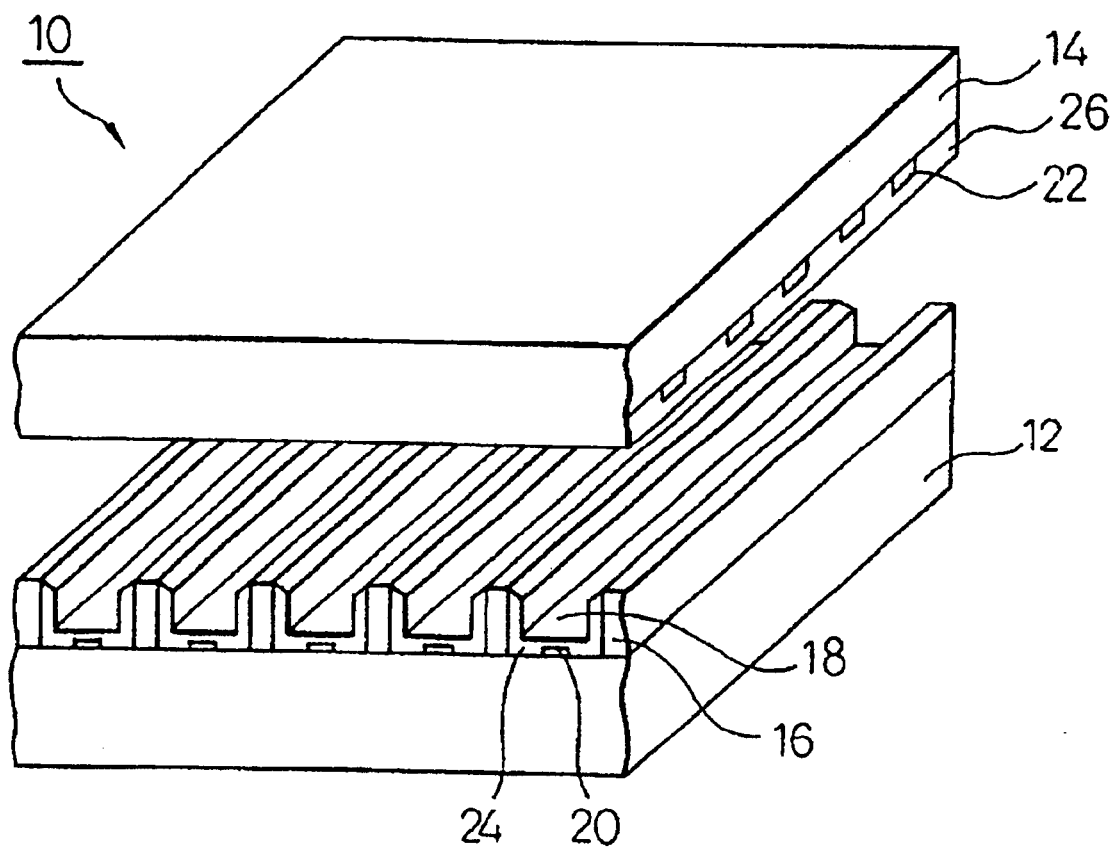
FIG. 1 is a partially exploded perspective view showing one embodiment of the substrate for PDP.

The present invention will be described by way of the following embodiments but is not limited thereto, as is apparent to a person with ordinary sill. In the drawings, the same reference numeral is applied to the same or equivalent portion.

In a partially exploded perspective view of FIG. 1, one embodiment of the substrate for PDP according to the present invention is schematically shown. This substrate 10 for PDP is used so-called A.C. PDP and is preferably equipped with transparent flat plates made of easily available soda-lime glass, which are facing each other at a distance, i.e. a back plate 12 and a front plate 14. Between the back plate 12 and front plate 14, plural ribs 16 having a predetermined dimension are provided to separate the space between the plates into cells, thereby making it possible to form a plurality of discharge display cells 18.

The rib 16 shown in the figure is formed from a photosensitive paste (rib precursor). Preferable photosensitive paste contains a first photo-setting component as a binder component, a photo-setting initiator having a first absorption edge and a ceramic powder and, if necessary, a glass powder. The ceramic powder is used for affording a fixed shape to the rib, and is preferably made of alumina, silica, titania or wollastonite having high strength.

The first photo-setting component is photopolymerized in the presence of the photo-setting initiator having a first absorption edge, thereby making it possible to retain the shape of the rib 16. The first photo-setting component is not specifically limited, but is preferably an acrylic resin. For example, the first photo-setting component may also be made from an acrylic monomer or oligomer, or a silane coupling agent having a methacryl group. Specifically, HEMA (hydroxyethyl methacrylate), HEA hydroxyethyl acrylate), Bis GMA (bis-phenol A diglycidylether methacrylate) or triethylene glycol dimetharylate monomer or oligomer thereof etc. can be preferably used.

Particularly, when the first photo-setting component is made of a silane coupling agent having a methacryl group, a network is formed by photopolymerization of the methacryl group, thereby making it possible to retain and contain the ceramic powder. In addition, the first photo-setting component of the silane coupling agent forms polymeric silicon dioxide having a high melting point by calcination. This network due to the silane coupling agent is substantially retained by silicon dioxide event at comparatively high temperature after calcination, thereby making it possible to retain the ceramic powder or glass powder. Such a silane coupling agent is preferably γ-methacryloxypropylmethyltrimethoxysilane, γ-methacryloxypropylmethyldimethoxysilane, γ-methacryloxypropyltriethoxysilane or γ-methacryloxypropytmethyldiethoxysilane having a molecular weight of 232 to 290 in view of availability.

The glass powder is used to enhance the strength by affording a dense structure to the rib. Basically, the glass powder is used in the amount enough to fill up small space between the network made of silicon dioxide and the ceramic powder surrounded with the 15 network. When the network does not exist, it is not necessary that the glass powder does not fill up large space between ceramic powders. As a result, the strength of the rib can be increased by a comparatively small amount of the glass powder. For example, even if the glass powder exclusively contains lead having high mass adsorption coefficient, the rate of photo-setting is hardly influenced. Use of the glass powder made of expensive glass having a low melting point can also be inhibited. Basically, the glass powder is contained in the amount of 10 to 70%/ by volume. Preferably, the glass powder is contained in the amount of 20 to 50% by volume, thereby further increasing the strength of the rib.

When this network is heated, together with the glass powder, the network is retained as far as silicon dioxide constituting it does not reach the melting point of silicon dioxide, thereby to cause no change in volume, substantially. If any change in volume arises, the degree is small.

When the front plate 14 or back plate 12 is, for example, made of glass having an annealing point of 550° C., the glass powder preferably has a softening point of 450–550° C. lower than the annealing point of the plates. Even if the glass powder having such a softening point is heated together with the front plate or back plate of glass to flow into a gap, a thermal deformation of the front plate 14 or back plate 12 can be prevented. The glass powder is made of lead glass containing boron, zinc, phosphoric acid, lead, titanium or a combination thereof, aluminum phosphate glass, boron-titanium glass, bismuth glass or zinc glass. In order to reduce the time of photo-setting of the rib precursor without taking high mass absorption coefficient into consideration, boron, zinc, phosphoric acid, titanium or a combination thereof is preferably contained. In this case, each composition is not specifically limited.

In each discharge display cell 18, an address electrode 20 is provided on a back plate 12 along a rib 16. On a front plate 14, a transparent bus electrode 22 made of an indium tin oxide (ITO) is provided vertically to the rib 16. In addition, a discharge gas such as neon, helium, xenone or the like is contained between the address electrode 20 and bus electrode 22, thereby making it possible to emit light by discharge. On each address electrode 20, a fluorescent layer 24 is provided in a predetermined order, thereby making it to possible to perform color display. On the front plate 14 and bus electrode 22, a transparent dielectric layer 26 is provided to coat the bus electrode 22, thereby making it possible to extend life of PDP by inhibition of sputtering of the bus electrode 22.

With reference to a flow sheet showing the steps of the production of the substrate for PDP shown in FIG. 2, formation of a rib and an apparatus therefor will be described in detail below.

Figure 2A:
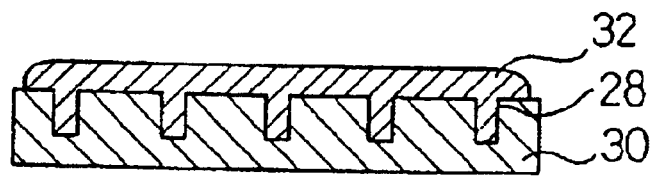
FIG. 2 is a flow sheet showing the steps of the method of producing the substrate for PDP according to the present invention.

First, a mold 30 having a concave portion 28 corresponding to the shape of a rib 16 is prepared (see FIG. 2(A)). Not shown in the drawing, the concave portion 28 may have a section in the shape of trapezoid. Also not shown in the drawing, releasability may also be imparted to the mold by coating the surface of the concave portion with a releasing agent.

This mold 30 can be obtained by photo-setting of a second photo-setting component in the presence of a second photo-setting initiator having a second absorption edge. As the second photo-setting component, an acrylic monomer or oligorner can be used. Specifically, as an acrylic monomer or oligomer, an aliphatic urethane acrylate, commercially available from Henschel Co. in the tradename of "Photomer 6010", or 1,6-hexanediol diacrylate commercially available from Shin-Nakamura Chemnical Co. can be preferably used. Since the mold is molded by photopolymerization, cutting of the resulting mold 30 is not required. Since photopolymerzation proceeds comparatively quickly, the mold 30 can be easily obtained in a short time.

Since such a mold 30 has a hardness lower than that of general glass or ceramic, breakage of the rib and base can be avoided in case of removing the mold from the substrate. As a result, the mold can be repeatedly used without being washed.

As mentioned above, photopolymerization of the second photo-setting component is conducted in the presence of the second photo-setting initiator having a second absorption edge whose wavelength is shorter than a wavelength corresponding to the second absorption edge of the first photo-setting initiator. Such a second photo-setting initiator cannot absorb light whose wavelength is longer than a wavelength corresponding to the second absorption edge. On the other hand, when the rib precursor is set by light having a wavelength longer than a wavelength corresponding to the second absorption edge, only the first photo-setting component is set by photopolymerization, thereby making it possible to avoid simultaneous photopolymerization of the second photo-setting component, even if unreacted second photo-setting component is remained in the mold 30. Preferable photo-setting initiator includes, for example, aminoketones (400–430 nm), bisacylphosphine oxide (440 nm), camphorquinone (500 nm), metallocene hydroxyketone (500 nm) and benzyl dimethyl ketal (380 nm), and are commercially available from Ciba Geigy Co. under the trade name of Lrgacure 2959 (370 nm), Irgacure 184 (380 nm), Dalocure 1173 (380 nm), Irgacure 500 (380 nm), Irgacure 1000 (380 nm), Irgacure 651 (390 nm), Irgacure 907 (400 nm), Irgacure 149 (420 nm), Irgacure 1700 (440 nm), Irgacure 1850 (440 nm), Irgacure 819 (450 nm), Irgacure 369 (480 nm) and Irgacure 784 (500 nm). Accordingly, selection of the first photo-setting initiator and the second photo-setting initiator can be done by appropriately select two kinds of photo-setting initiators having different absorption edges listed above. A combination of the first photo-setting initiator and second photo-setting initiator includes, for example, Dalocure 1173 having an absorption edge at awavelength corresponding to 380 nm, and Irgacure 819 having an absorption edge at a wavelength corresponding to 440–450 nm, Irgacure 1700 and Irgacure 1850, or the like.

Figure 2B:
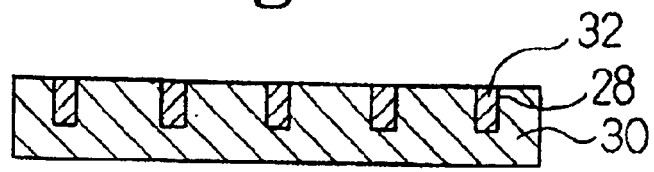

Then, a photosensitive paste 32 is applied on the mold 30 and the concave portion 28 is filled with it (see FIG. 2(B)).

The photosensitive paste 32 preferably has a viscosity of $1 \times 10^3$ to $1 \times 10^5$ cps. By using the viscosity within such a range, filling up of the photosensitive paste can be conducted with high accuracy. The photosensitive paste containing a silane coupling agent as the first photo-setting component may contain a mineral acid such as hydrochloric acid, nitric acid or the like to hydrolyze the silane coupling agent, thereby providing a photosensitive paste in the form of a sol. Such a photosensitive paste is not gelled by drying, thereby making it possible to disperse the ceramic powder and ceramic powder. Furthermore, the viscosity does not depend on the amount of water.

Figure 2C:
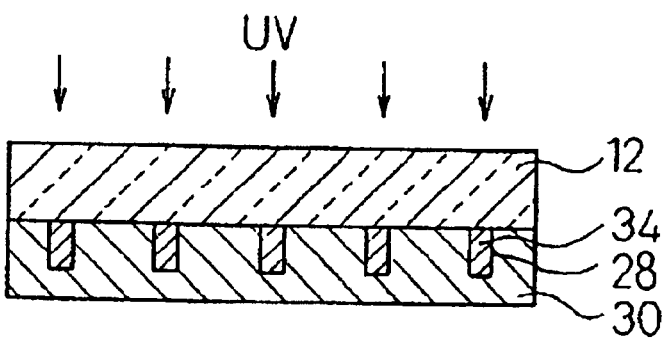

Then, a back plate 12 is made contact with the photosensitive paste 32 (see FIG. 2(C)). The second photo-setting component mentioned above can impart flexibility to the mold 30 on photopolymerization. In such case, the mold 30 is made contact with the photosensitive paste 32 from one end by bending the mold. Accordingly, an air between the back plate 12 and the photosensitive paste 32 is efficiently removed out to the exterior and infiltration of the air into the photosensitive paste 32 is also avoided.

Then, the first photo-setting component is polymerized by exposing the photosensitive paste 32 to light (hv) having a wavelength longer than that of the second absorption edge of the second photo-setting component, thereby obtaining a rib molded article 34 (see FIG. 2(C)). In this case, the polymerization is basically conducted only by light exposure and does not require heat management whose control is difficult, in principle. The second photo-setting component of the present embodiment can also impart transparency to the mold 30 on photopolymenzation. When the mold 30 is transparent, exposure of the photosensitive paste 32 to light can be conducted simultaneously from both surfaces through not only the back plate 12 but also through the mold 30. As a result, light can sufficiently reach the first photo-setting initiator and first photo-setting component, which exist in the depths of the concave portion 28, and the unreacted first photo-setting component is not remained at the free end of the molded article 34. Furthermore, substantially uniform mechanical strength is afforded to the molded article 34, Light used for exposure has a comparatively long wavelength and is absorbed only in the first photo-setting initiator. Therefore, light is not substantially absorbed by the second photo-setting initiator, and only the polymerization of the first photo-setting component is initiated to obtain the molded article 34. As a result, even if the unreacted second photo-setting component is remained in the mold 30, it is possible to inhibit the unreacted second photo-setting component from reacting with the first photo-setting component. That is, the molded article 34 is capable of avoiding adhesion to the mold 30 by photopolymerization.

Figure 2D:
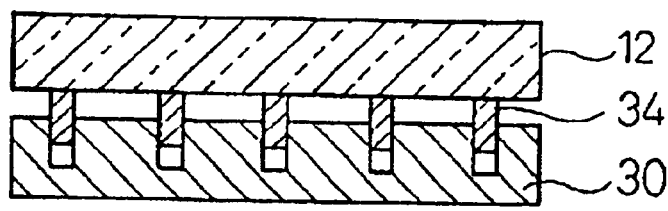

Then, the molded article 34 is removed from the mold 30, thereby transferring the molded article 34 integrally to the back plate (see FIG. 2(D)). As mentioned above, adhesion of the molded article 34 to the mold is avoided. Accordingly, such a removal can be easily conducted without causing breakage of the back plate 12 or molded article 34 or its free end, thereby to leave it in the mold 30. As a result it becomes possible to repeatedly use the mold 30 without being washed, thereby making it possible to improve the productivity of the substrate for PDP.

Figure 2E:
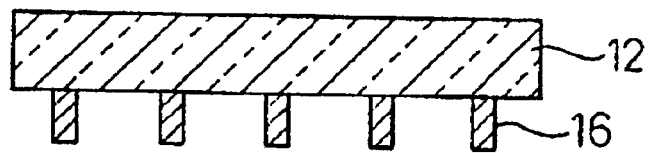

Then, both of the molded article 34 and back plate 12 are put in a calcining oven (not shown) and calcined at a predetermined temperature to obtain a rib 16 (see FIG. 2(E)). Before and after this calcination, retention of the network mentioned above is substantially made, thereby reducing shrinkage of the molded article. Accordingly, it is possible to make a rib corresponding to the shape of the concave portion with good accuracy.

If necessary, an address electrode may also be formed between ribs on the back plate, and fluorescent layer may be provided on the address electrode. Then, a transparent front plate, on which a bus electrode has previously been formed, may also be disposed to face with the back plate via a nib. Furthermore, the peripheral portions of the front plate and back plate may be sealed in an air-tight manner by using a sealing material which is not shown in the drawing, thereby forming a discharge display cell between the front plate and back plate. Thereafter, the discharge display cell may be evacuated and a discharge gas may be introduced to form a substrate for PDP.

Although the present invention has been described in accordance with the a.c. substrate for PDP, it is understood by a person with ordinary skill that the present invention can also be applied to the d.c. substrate for PDP.

EXAMPLE

Example 1

A photosensitive paste was prepared in the following procedure. First, 4g of γ-methacryloxypropylmethyldimethoxysilane (manufactured by Nippon Unicar Co.) as a first photo-setting component was prepared. In addition, 1g of a mixed solution of an aqueous 0.01N nitric acid solution and ethanol in a molar ratio of 2:1 was prepared. After these components were mixed and sufficiently stirred, the mixture was reacted by allowing to standing at 70° C. for 12 hours. Then, the reaction product was dried at 70° C., and water and alcohol were removed by evaporation.

To 4g of this dried reaction product, 0.03g of a first photo-setting initiator and 16g of a ceramic powder were added. As the first photo-setting initiator, bis(2,4,6-trimethylbenzoyl)-phenylphosphine oxide commercially available from Ciba Geigy Co. under the trade name of Irgacure 819 was used. This first photo-setting initiator has an absorption edge at a wavelength of about 450 nm. As the ceramic powder, an α-alumina commercially available from Showa Denko Co. under the trade name of A1-45-2 was used. This α-alumina has an average particle diameter of 2.1 μm.

Then, a mold having a concave portion corresponding to the shape of a rib was prepared. This mold was formed from a second photo-setting component in the presence of 1% by weight of a second photo-setting initiator. As the second photo setting component, an aliphatic urethane acrylate oligomer commercially available from Henschel Co. under the trade name of Photomer 6010 was used. As the second photo-setting initiator, 2-hydroxy-2-methyl-1-phenyl-propan-1-one commercially available from Ciba Geigy Co. under the trade name of Dalocure 1173 was used. This initiator has an absorption edge at a wavelength corresponding to 380 nm. Photopolymerization of the second photo-setting component was conducted by exposure to ultraviolet light of 200 to 450 nm from an ultraviolet light source (trade name: Unicure) manufactured by Ushio Denki Co.

The concave portion of the mold was filled with the above photosensitive paste. Then, a transparent back plate was placed on this mold, thereby making contact with photosensitive paste in the concave portion. Using a fluorescent lamp manufactured by Philips Co., photopolymerization of the first photo-setting component was conducted by exposure to light having a wavelength of 400 to 500 nm for 30 seconds. Exposure to light was conducted simultaneously from both sides of the transparent mold and transparent substrate. Then, a molded article together with the back plate was removed from the mold. In this case, removal of the molded article from the mold could be conducted without causing breakage of the molded article or back plate. Then, the molded article and back plate were put in a calcinating oven at 500° C. to obtain a rib.

Comparative Example 1

In this example, the same photosensitive paste and mold as those in Example 1 were used. However, photopolymerization of the first photo-setting component was conducted by using the above ultraviolet light source in place of a fluorescent lamp manufactured by Philips Co. As a result, the back plate could not be removed from the mold, together with back plate, because of strong adhesion between the mold and molded article. The molded article was forcibly removed from the mold, resulting in breakage of the molded article.

Comparative Example 2

In this example, the same photosensitive paste as that in Example 1 was used. However, the mold in this example was made by using the second photo-setting component and first photo-setting initiator of Example 1 in place of the second photo-setting component and second photo-setting initiator. In this case, photopolymerization of the second photo-setting component for obtaining the mold was conducted by using the above ultraviolet light source.

After the concave portion of the mold was filled with the above photosensitive paste, photopolymerization of the first photo-setting component for obtaining a rib precursor was conducted by using the above fluorescent lamp. As a result, the back plate could not be removed from the mold, together with back plate, because of strong adhesion between the mold and molded article. The molded article was forcibly removed from the mold, resulting in breakage of the molded article.

Effect of the Invention

According to the method of producing the substrate for PDP of the present invention, breakage of the base and rib is avoided and the mold can be repeatedly used.

What is claimed is:

1. A method of producing a substrate for a plasma display panel by providing a rib on a base, which comprises the steps of:
   contacting a rib precursor containing a first photo-setting initiator having a first absorption edge and a first photo-setting component closely with said base;
   filling a mold, obtained by photo-setting of a second photo-setting initiator having a second absorption edge whose wavelength is shorter than a wavelength corresponding to said first absorption edge of said first photo-setting initiator, with said rib precursor;
   exposing said rib precursor to light having a wavelength longer than a wavelength corresponding to said second absorption edge, thereby setting said rib precursor; and
   removing said mold.

2. The method according to claim 1, wherein the base and mold are transparent and exposure of the rib precursor to light is conducted via the base and mold.

3. The method according to claim 1, wherein the mold is flexible.

4. The method according to claim 1, wherein the first photo-selling initiator has the first absorption edge corresponding to a wavelength of 400 to 500 nm and the second photo-setting initiator has the second absorption edge corresponding to a wavelength of 300 to 400 nm.

5. The method according to claim 1, wherein the first photo-setting component and second photo-setting component are acrylic resin.

6. The method according to claim 1, wherein the rib precursor contains a powder of ceramic and optionally contains a powder of glass.

7. A method of producing a substrate for a plasma display panel by providing a rib on a base, which comprises the steps of
   filling a mold, obtained by photo-setting of a second photo-setting initiator having a second absorption edge whose wavelength is shorter than a wavelength corresponding to said first absorption edge of said first photo-setting initiator, with a rib precursor containing a first photo-setting initiator having a first absorption edge and a first photo-setting component,
   contacting said rib precursor closely with said base,
   exposing said rib precursor to light having a wavelength longer than a wavelength corresponding to said second absorption edge, thereby setting said rib precursor, and
   removing said mold.

8. The method according to claim 7, wherein the base and mold are transparent and exposure of the rib precursor to light is conducted via the base and mold.

9. The method according to claim 7, wherein the mold is flexible.

10. The method according to claim 7, wherein the first photo-setting initiator has the first absorption edge corresponding to a wavelength of 400 to 500 nm and the second photo-setting initiator has the second absorption edge corresponding to a wavelength of 300 to 400 nm.

11. The method according to claim 8, wherein the first photo-setting component and second photo-setting component are acrylic resin.

12. The method according to claim 7, wherein the rib precursor contains a powder of ceramic and optionally contains a powder of glass.

* * * * *

UNITED STATES PATENT AND TRADEMARK OFFICE
CERTIFICATE OF CORRECTION

PATENT NO. : 6,843,952 B1
DATED : January 18, 2005
INVENTOR(S) : Yokoyam, Chikafumi It is certified that error appears in the above-identified patent and that said Letters Patent is hereby corrected as shown below:

Column 1,
Line 34, delete "nib" and insert -- rib --, therefor.
Line 40, delete "(KOKA)" and insert -- (KOKAI) --, therefor.

Column 2,
Line 1, delete "a" before "exposing".
Line 32, delete "sill" and insert -- skill --, therefor.
Line 62-63, after "HEA" delete "hydroxyethyl acrylate)" and insert -- (hydroxyethyl acrylate) --, therefor.
Line 64, delete "dimetharylate" and insert -- dimethacrylate --, therefor.

Column 3,
Line 14, delete "γ-methacryloxypropylmethyldiethoxysilaneo" insert
-- γ-methacryloxypropylmethyldiethoxysilaneo --, therefor.
Line 20, delete "15" before "network".
Line 30, delete "70%/" and insert -- 70% --, therefor.

Column 4,
Line 17, delete "oligorner" and insert -- oligomer --, therefor.
Line 21, delete "Chemnical" and insert -- Chemical --, therefor.
Lines 23-24, delete "photopolymerzation" and insert -- photopolymerization --, therefor.
Line 51, after "name of" delete "Lrgacure" and insert -- Irgacure --, therefor.
Line 63, delete "awavelength" and insert -- a wavelength --, therefor.
Line 63, delete "380 nm," and insert -- 380 nm --, therefor.

Column 5,
Line 31, delete "photopolymenzation" and insert -- photopolymerization --, therefor.
Line 40, delete "34," and insert -- 34. --, therefor.
Line 59, after "As a result" insert -- , --.

Column 6,
Line 8, delete "nib" and insert -- rib --. therefor.
Line 21, delete "EXAMPLE" and insert -- EXAMPLES --, therefor.

UNITED STATES PATENT AND TRADEMARK OFFICE
CERTIFICATE OF CORRECTION

PATENT NO. : 6,843,952 B1
DATED : January 18, 2005
INVENTOR(S) : Yokoyam, Chikafumi It is certified that error appears in the above-identified patent and that said Letters Patent is hereby corrected as shown below:

<u>Column 8,</u>
Line 14, delete "photo-selling" and insert -- photo-setting --, therefor.

Signed and Sealed this

Twenty-ninth Day of March, 2005

JON W. DUDAS
*Director of the United States Patent and Trademark Office*